(12) United States Patent
McCarthy

(10) Patent No.: US 6,898,218 B2
(45) Date of Patent: May 24, 2005

(54) METHOD AND APPARATUS FOR INCREASING THE INTENSITY OF AN EYE SAFE LASER

(75) Inventor: John C. McCarthy, Stratham, NH (US)

(73) Assignee: Bae Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 10/424,300

(22) Filed: Apr. 28, 2003

(65) Prior Publication Data

US 2004/0012841 A1 Jan. 22, 2004

Related U.S. Application Data

(60) Provisional application No. 60/390,952, filed on Jun. 24, 2002.

(51) Int. Cl.[7] .............................. H01S 3/10; G02F 2/02
(52) U.S. Cl. ............................ 372/21; 372/22; 359/330
(58) Field of Search ...................... 372/21, 22; 359/330

(56) References Cited

U.S. PATENT DOCUMENTS

| | | | | |
|---|---|---|---|---|
| 5,400,173 A | * | 3/1995 | Komine ..................... | 359/330 |
| 5,663,973 A | * | 9/1997 | Stamm et al. ............... | 372/20 |
| 6,359,914 B1 | * | 3/2002 | Powers et al. .............. | 372/25 |

OTHER PUBLICATIONS

Hutchinson et al., "Multifunction Laser Radar," Proceedings of SPIE, vol. 3707, pp. 222–233, 1999.*

PCT International Search Report dated Nov. 23, 2004 of International Application No. PCT/US03/19934 filed Jun. 24, 2003.

Larry R. Marshall, Alex Kax and Orhan Aytur, "Multimode Pumping of Optical Parametric Oscillators," IEEE Journal of Quantum Electronics 32 177–172 (1996).

* cited by examiner

Primary Examiner—Minsun Oh Harvey
Assistant Examiner—James Menefee
(74) Attorney, Agent, or Firm—Robert K. Tendler; Daniel J. Long

(57) ABSTRACT

A higher intensity eye safe laser is provided for long range target designation or illumination as well as long range eye safe communications by providing a single beam line combination of an optical parametric oscillator and optical parametric amplifier which are used to double the output of the optical parametric oscillator while limiting beam spread to less than 1.2 milliradians assuming a 20 mm clear aperture. The OPO/OPA combination requires no conditioning, isolation or synchronization optics and provides a factor of two improvements in beam quality as compared to an equivalent optical parametric oscillator, with the subject system providing a compact robust configuration. The high conversion is provided by the use of a simple optical parametric oscillator seeding an optical parametric amplifier without double passing the pump pulse in the optical parametric oscillator. Low beam divergence operation is provided with minimum optics in a compact space with the optical parametric oscillator operating at a reduced signal intercavity flux which provides increased damaged threshold margins.

18 Claims, 4 Drawing Sheets

METHOD AND APPARATUS FOR INCREASING THE INTENSITY OF AN EYE SAFE LASER

CROSS REFERENCE TO RELATED APPLICATIONS

This utility patent application relates to U.S. Provisional Application No. 60/390,952, entitled: Efficient, High Brightness KTP Optical Oscillator—Amplifier In Single Beamline and filed Jun. 24, 2002.

FIELD OF INVENTION

This invention relates to eye safe lasers and more particularly to the utilization of a combined optical parametric oscillator and an optical parametric amplifier to significantly increase power without increasing beam divergence.

BACKGROUND OF THE INVENTION

High-energy "eye safe" laser illumination is needed for various ranging and illumination applications most specifically with respect LIDAR and gated viewing systems. Of specific interest is single pulse identification at ranges exceeding 25 km using a 1.5 micron source packaged for airborne operation. The desired combination of high pulse energy, low beam divergence within the system packaging and operating constraints has proved challenging as reported by Larry R. Marshall, Alex Kax and Orhan Aytur, in an article entitled "*Multimode Pumping of Optical Parametric Oscillators*", IEEE Journal of Quantum Electronics 32 177–182 (1996). It will be appreciated that airborne systems require and in fact mandate compactness, low weight and reliability.

In the past laser target designators have used Nd:YAG pumped KTP crystals utilized in an optical parametric oscillator which produces 60 mJ of energy when pumping the optical parametric oscillator with a 1 micron pumping source.

The task for military and other purposes requires a doubling of the output energy so as to provide a long-range eye safe laser for use in long range laser ranging and laser illumination applications. In order to provide the required energy on target, between 100 mJ and 200 mJ must be produced from the laser transmitter with a beam quality of less than 25 mm-milliradian. For this application, such performance must be obtained using a designator class laser, 300 mJ, 20 Hz, in a compact configuration, with a transmitting aperture less than 20 mm.

One of the first attempts to increase power for such eye safe lasers included simply adding additional KTP crystals in the oscillator cavity, with the suggestion of using three such crystals to boost the 60 mJ prior output power to a 150 mJ level.

However, this approach while generating the required output power, resulting in a beam spread of 80 milliradians, clearly an order of magnitude greater than that which is desirable. It is noted that the cross section of such a beam at 25 kilometers puts very little of the projected energy on target. Moreover, for target illumination purposes requiring high resolution, such beam widths are not readily unusable.

In an effort to reduce the beam divergence, it was suggested to pump an optical parametric oscillator followed by an optical parametric amplifier by dividing the pumping pulse into two pulses. The first pulse was to be redirected through the optical parametric amplifier, whereas the second pulse is directed through a pulse timing delay unit so as to appropriately pump the follow on optical parametric amplifier.

However, providing an optical delay takes up a significant amount of space and requires an increased parts count which can in some cases deleteriously affect the efficiency of the system due to alignment problems.

Also synchronizing the pulse time delay is non-trivial problem so that the pumping pulse from the pumping laser arrives at the optical parametric amplifier so that it is not pumped too soon. It would therefore be desirable to have a single beam line system which avoids alignment problems while at the same time eliminating beam redirecting optics and yet still have an intense output beam with a less than 1.2 milliradian beam divergence.

As will be appreciated, the above proposed optical parametric oscillator, optical parametric amplifier combination was initially ruled out due to the optical complexity and space needed to split and synchronize the pump beam.

SUMMARY OF THE INVENTION

Rather than attempting to amplify the output of an eye safe laser by merely inserting more crystals in the oscillator cavity, and rather than providing a system in which an optical parametric oscillator, OPO, was followed by an optical parametric amplifier, OPA, provided with separate pumping pulses, in the subject invention an optical parametric oscillator, optical parametric amplifier combination was placed on a single beam line starting with the pump laser, followed by the optical parametric oscillator and followed in turn by the optical parametric amplifier outside of the oscillator cavity. Surprisingly, in a first test of the subject system the signal output energy was within 5% of the multi-crystal optical parametric oscillator system but had significant improvement in beam divergence.

Two factors prompted moving two of the three OPO crystals directly outside the optical cavity of the optical parametric oscillator. The first factor is alignment insensitivity in the non-critically phased matched OPO crystal orientation, and secondly the long operating pump pulse width of 18 nanoseconds.

To further reduce signal beam divergence, the optical parametric oscillator was reconfigured to an unstable resonator having a magnification of 1.25 and with a cavity length of 8 cm. With a 1064 nanometer pumping laser, a fused silica input mirror was 75 cm concave providing high transmission at 1064 nanometers and high reflectivity at 1570 nanometers. The out coupler, also fused silica, was a 60 cm convex device, with a 45% reflective at 1570 nanometers, with less than 5% reflective at the pump and idler wavelength. This optical parametric oscillator, combined with the direct pumped dual crystal optical parametric amplifier provided required brightness and operated with slope efficiency approaching 60%. In one embodiment, signal OPO-OPA combination the increased OPO threshold to 110 mJ versus 50 mJ, with both configurations producing approximately equal signal outputs. Interestingly, up to 75 mJ of Amplified Parametric Emission was obtained with OPO cavity mirrors removed.

More specifically, in one embodiment a 300 mJ pump laser operating at 1 micron was used to pump the optical parametric oscillator which was configured so as to be a singly resonant oscillator having an output only at 1.5 microns. The output power from optical parametric oscillator was measured to be 75 mJ. Moreover, the pump power left over after pumping the optical parametric oscillator was measured to be 225 mJ which was injected into the optical parametric amplifier.

It was interesting to note that there was no optical delay timing necessary due to the inline, single beam line configuration, and synchronization of pumping pulses was completely eliminated with the subject configuration.

While the OPO–OPA combination did produce 3.0 micron outputs, these were suppressed through appropriate coating on the mirrors forming the cavity.

The result is an eye safe laser having double the power currently provided which permits long range laser ranging up to 25 kilometers as well as utility in laser illuminating systems. With a 20 mm clear aperture and a less than a 1.2 milliradian beam divergence, the subject laser can be utilized for single pulse applications in which objects can be identified exceeding 25 kilometers. Due to the narrowness of the beam angle, resolution of target recognition systems is greatly improved over the long distances.

In summary, a higher intensity eye safe laser is provided for long range target designation or illumination as well as long range eye safe communications by providing a single beam line combination of an optical parametric oscillator and optical parametric amplifier which are used to double the output of the optical parametric oscillator while limiting beam spread to less than 1.2 milliradians with a 20 mm aperture. The OPO/OPA combination requires no conditioning, isolation or synchronization optics and provides a factor of two improvements in beam quality as compared to an equivalent optical parametric oscillator, with the subject system providing a compact robust configuration. The high conversion is provided by the use of a simple optical parametric oscillator seeding an optical parametric amplifier without double passing the pump pulse in the optical parametric oscillator. Low beam divergence operation is provided with minimum optics in a compact space with the optical parametric oscillator operating at a reduced signal intercavity flux which provides increased damaged threshold margins.

BRIEF DESCRIPTION OF THE DRAWINGS

These and other features of the subject invention will be better understood in connection with the Detailed Description in conjunction with the Drawings, of which.

DETAILED DESCRIPTION

Figure 1:
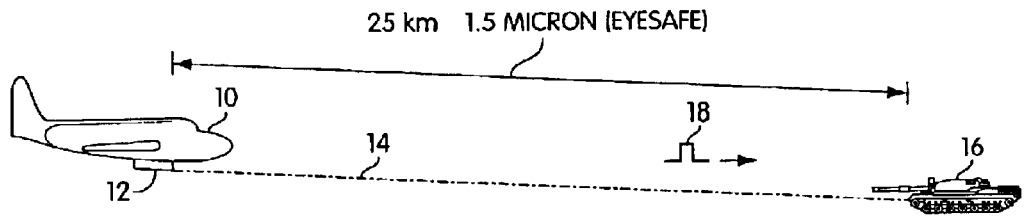
FIG. 1 is a diagrammatic illustration of a tactical situation in which an airborne laser target designator produces a single pulse for illuminating a target at a substantial distance in which the laser is an eye safe laser operating in the 1.5 micron region of the electromagnetic spectrum.

Referring now to FIG. 1, for eye safe laser target designation or target illumination, in an airborne application an aircraft 10 is provided with a laser target designator 12 which provides a beam 14 directed to a target 16 in which the target is illuminated by a single pulse 18.

It will be appreciated that it is important to provide an eye safe laser for such laser target designation or illumination due to the fact that human beings may be in the area and if the radiation impinges upon the eye of a human being, damage can occur unless the radiation is in the 1.5 micron range.

For long distance eye safe laser ranging and illumination, for instance up to and exceeding 25 km, it is only with difficulty that one can provide sufficient power on target to operate at such long ranges.

Figure 2:
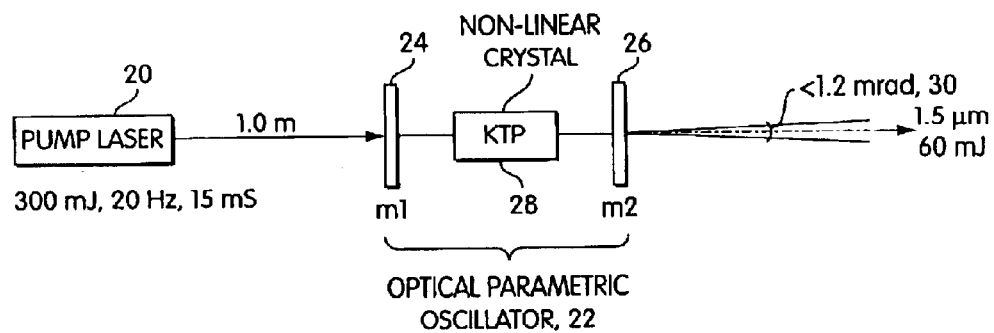
FIG. 2 is a block diagram of a prior art laser for use in a laser target designating system in which an optical parametric oscillator utilizes a non-linear crystal such as KTP pumped by a 1 micron pumping laser to produce a 60 mJ output having a beam divergence less than 1.2 milliradians with a 20 mm aperture.
Figure 3:
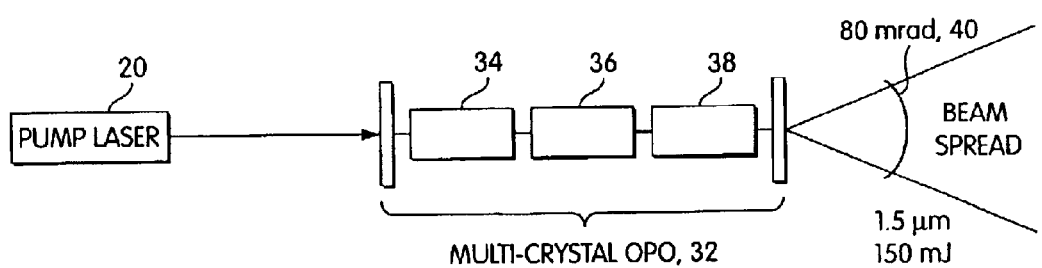
FIG. 3 is a block diagram of a proposed multicrystal optical parametric oscillator for increasing the output over the system depicted in FIG. 2 but resulting in an unacceptable beam spread.

Referring to FIG. 2, as has been attempted, a pump laser 20 has been utilized to pump an optical parametric oscillator 22 having an input mirror 24 and an output mirror 26 into which is disposed a non-linear crystal 28 usually of KTP. The result is a output beam 30 having an output power of 60 mJ and a beam divergence of less than 1.2 milliradians with a 20 mm aperture, clearly usable for close in laser target designation and illumination applications, but not enough power for robust long range work.

Note that beam divergence depends on aperture size. When one multiplies the aperture size with beam divergence, one gets a beam quality characteristic measured in terms of mm-milliradians. Thus for a 20 mm clear aperture and a 1.2 milliradian beam spread, one has a beam quality of 24 mm-milliradians.

In typical military designator/range finder laser transmitters, the KTP optical parametric oscillator is pumped using the 300 mJ to 400 mJ output from the 1.06 $\mu$m designator laser. In one embodiment, the pumping laser is a diode-pumped, conduction cooled, Nd:YAG zig-zag slab oscillator-amplifier which produces 300 mJ at 1064 nm with a pulse repetition frequency of 20 hertz, and with each of the pulses being 15 nanoseconds in duration.

As mentioned hereinbefore, 60 mJ is insufficient for long range operation. In an effort to increase the laser output, the pumping laser was used to pump a multi-crystal optical parametric oscillator 32 having three KTP crystals 34, 36 and 38, with the result that an output beam 40 did indeed deliver the 150 mJ. However, the output beam had significant divergence or beam spread measured at one point at 80 milliradians for a 20 mm aperture. It will be appreciated that such a widely diverging beam has no ready application for long range laser target designators or laser target illuminators.

Figure 4:
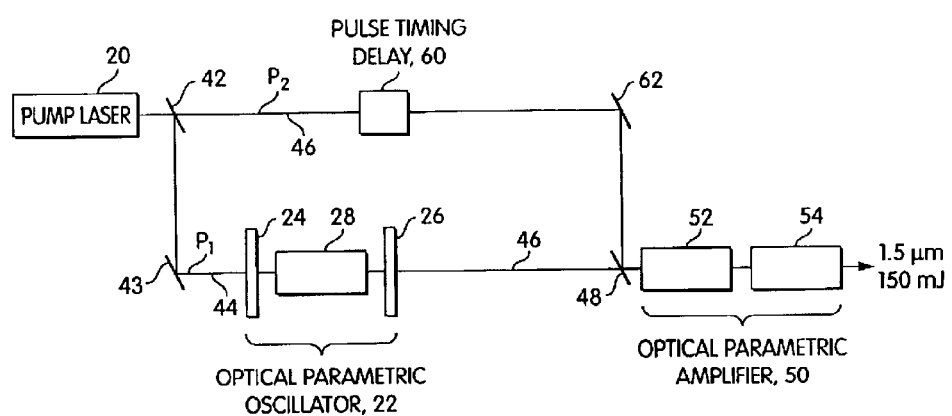
FIG. 4 is a block diagram of a combined optical parametric oscillator, optical parametric amplifier system in which pumping pulses are split apart, with one pumping pulse used to pump the optical parametric oscillator and with the other pumping pulse delayed and used to pump the optical parametric amplifier, illustrating the number of optical elements used.

In an effort to minimize beam spread, referring now to FIG. 4, a combined optical parametric oscillator and optical parametric amplifier was designed in which pump laser 20 had its output divided by beam splitting mirror 42 into two pumping pulses P1 along path 44 and P2 along path 46. The first pumping pulse was delivered to optical parametric oscillator 22 identical to that of FIG. 2, the output of which on line 46 was passed through a beam splitting mirror 48 to an optical parametric amplifier 50 having two additional crystals 52 and 54 identical to the KTP non-linear crystal 28.

The second pumping pulse, P2, was to be passed through an optical pulse timing delay unit 60 which was to be redirected by a mirror 62 to beam splitting mirror 48 where the delayed pumping pulse was injected into optical parametric amplifier 50.

Figure 5A:
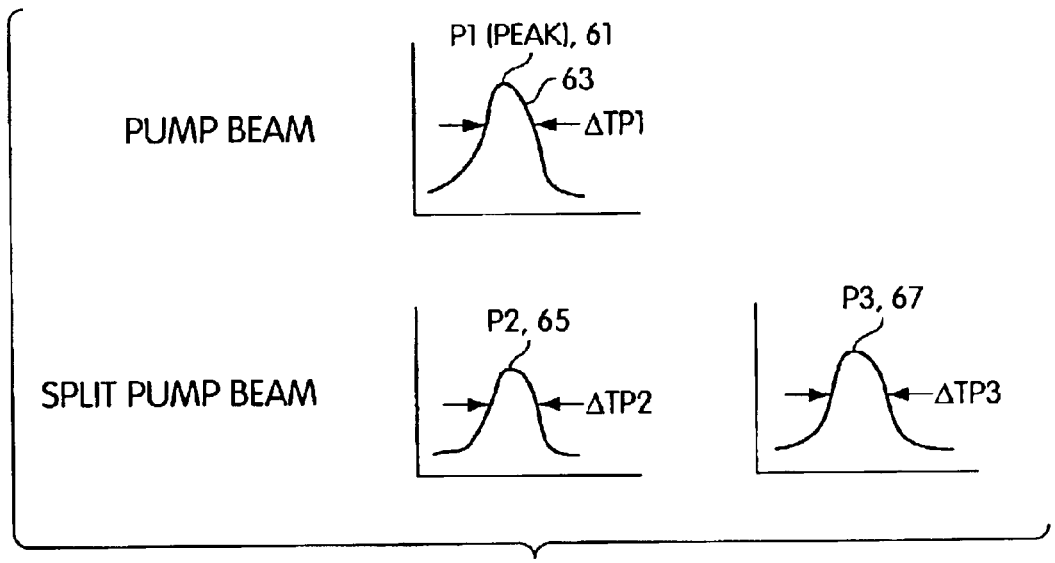
FIGS. 5A, 5B, and 5C are graphs showing the generation of pumping pulses and the resultant output from respectively the optical parametric oscillator and optical parametric amplifier of FIG. 4, indicating the delay necessary in the pumping pulse to the optical parametric amplifier.

However, the timing, synchronization and duration of these two pulses is critical in the generation of the higher amplitude output. Referring to FIG. 5A, the pumping pulse 61 is illustrated as having a waveform 63 with a peak at point P1 and a temporal duration of $\Delta TP_1$. This pumping pulse is split at mirror 42 into pulses 65 and 67, respectively, P2 and P3, which only reduces the peak amplitude but does not alter the waveform shape or temporal duration. Note that $\Delta TP_1 = \Delta TP_2 = \Delta TP_3$.

Figure 5B:
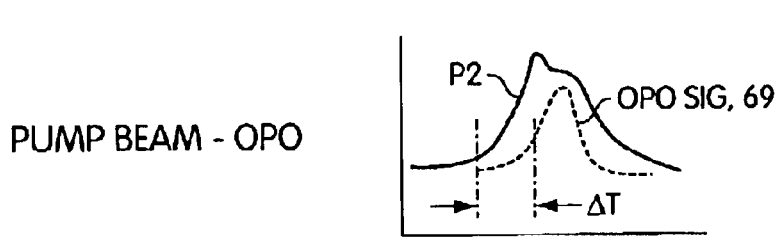

Referring to FIG. 5B, pumping pulse P2 is directed into the OPO, which generates an OPO signal output 69. The generated OPO signal waveform is of shorter duration than the pumping pulse due to the non-linear nature of the device. Note that a portion of the pump pulse is needed to achieve threshold, $\Delta T_{thresh}$, in the device and once that threshold is exceeded the OPO signal is rapidly extracted.

Figure 5C:
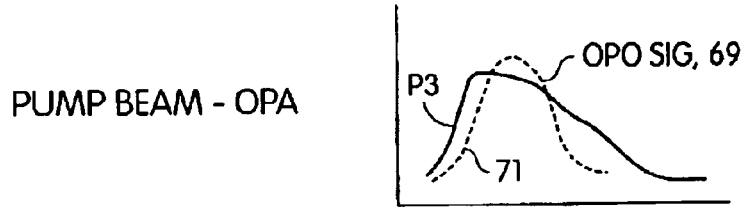

Referring to FIG. 5C, an optical delay 67 is introduced for P3 to insure P3 arrives at the OPA at the beginning 71 of the OPO signal, and increases the peak OPO signal. This addresses the fact that there is a delay between the time that the OPO lasers and when the OPO needs to be pumped when using the dual pulse pumping system.

As can be seen from FIGS. 5A, 5B, and 5C, there are significant synchronization issues introduced due to the fact that the optimal pumping pulse for the optical parametric amplifier must be delayed with respect with respect to the optimal pumping pulse for the optical parametric oscillator. Moreover, for the delayed pulse pumping there are at least five additional optical elements, namely the four mirrors involved in the pump pulse beam splitting and the optical pulse timing delay unit 60. Not only are the parts count increased, but alignment problems are exacerbated in terms of the mirrors involved. Moreover, the laser target designator/illuminator of FIG. 4 is not at all compact as there has to be significant space allotted for the separation of the two pumping pulses and the pumping pulse timing delay unit.

Figure 6:
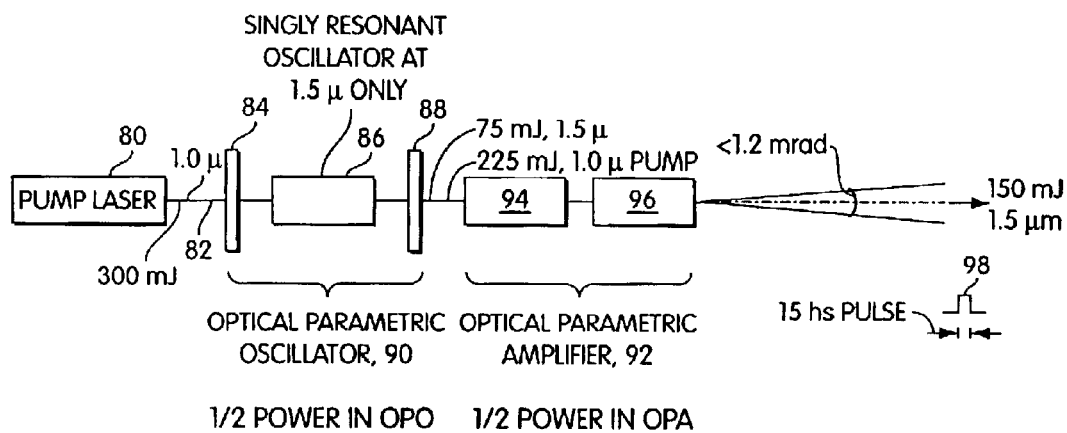
FIG. 6 is a block diagram of the subject combined optical parametric oscillator and optical parametric amplifier located in a single beam line in which the optical parametric oscillator is pumped with the output from a pump laser, the output of which is utilized to pump the optical parametric amplifier without the requirement of synchronization, thus to produce a 150 mJ output at 1.5 microns with a less than 1.2 milliradian beam divergence when using a 20 mm aperture, with half of the power from the optical parametric oscillator and with the other half of the power from the optical parametric amplifier; and, FIG. 7 is a pair of graphs showing the pumping pulse for the optical parametric oscillator and the reduced power of the optical parametric amplifier pumping pulse, with the original pumping pulse being reduced by the amount of energy converted by the optical parametric oscillator to produce its 75 mJ output which is coupled to the optical parametric amplifier.

Referring now to FIG. 6, in one embodiment of the subject invention two pumping pulses are avoided. Rather a single pumping pulse is first delivered to the oscillator with enough of the pumping pulse left over from the output of the oscillator to pump the amplifier. Moreover, since the left over pumping pulse comes out of the oscillator with the 1.5 micron signal output, it arrives at exactly the right time to pump the amplifier, just as the amplifier is receiving the output of the oscillator.

To illustrate this, in FIG. 6 a pumping laser 80 has its output 82 directed though an input mirror 84 into a singly resonant oscillator having a crystal 86 interposed between input mirror 84 and output mirror 88. The combination of input mirror 84 crystal 86 and output mirror 88 constitutes optical parametric oscillator 90 as illustrated.

In one embodiment, the pumping laser is a diode laser producing a 300 mJ output at 1.0 microns, with the non-linear crystal 86 being a KTP crystal. When this crystal is pumped with 1.0 micron energy, its response is an output at 1.5 microns as well as 3.3 microns. However, coatings on mirrors 84 and 88 suppress the 3.3 micron output such that upon pumping optical parametric oscillator 90 produces a 75 mJ output at 1.5 microns coupled into an optical parametric amplifier 92 composed of non-linear crystals 94 and 96 identical in one embodiment to the crystal in optical parametric oscillator.

Thus it will be seen that the optical parametric amplifier is seeded with 75 mJ at 1.5 microns as well as a pumping pulse of 225 mJ of 1.0 micron energy.

It has been found that the output from the optical parametric amplifier is 150 mJ at 1.5 microns with a beam divergence less than 1.2 milliradians assuming a 20 mm aperture.

What will be appreciated is that there need be no specialized synchronization for the pumping pulses for the optical parametric oscillator and the optical parametric amplifier. The delay of the 225 mJ pumping pulse caused by the pumping of the optical parametric oscillator is exactly such as to provide the appropriate timing for the pumping pulse for the optical parametric amplifier. The result also is a 15 nanosecond pulse 98 useful for long range eye safe single pulse target illumination and designation.

Figure 7:
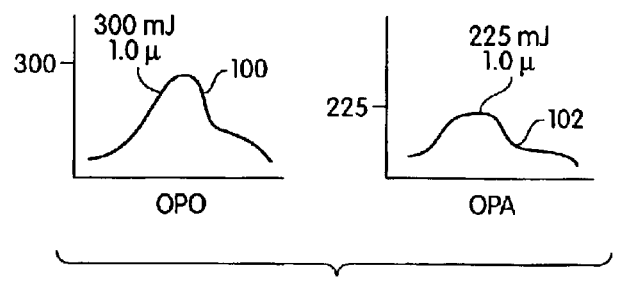

Referring to FIG. 7, it will be appreciated that the pumping pulse for the optical parametric oscillator is at 300mJ and 1.0 microns as illustrated by waveform 100, whereas the pumping pulse 102 for the optical parametric amplifier is at 225 mJ at 1.0 microns, with this waveform being slightly flattened due to the fact of its having passed through the optical parametric oscillator.

As will be seen, one has therefore taken the Nd:YAG pumped KTP optical parametric oscillator of the prior art and amplified its output from 60 mJ to 150 mJ at greater than 35% efficiency with less than 1.2 milliradians beam divergence using in one embodiment the existing telescope magnification of 3.8 and a clear aperture 20 millimeter combination. In this embodiment, the prior diode pump Nd:YAG laser was configured as an oscillator amplifier using identical side diode pumped conduction cooled zig-zag slabs. The details of such a pump laser have been described in *"Multifunction Laser Radar"* J. A. Hutchinson, C. W. Trussell, S. J. Hamlin, T. H. Allik, J. C. McCarthy and M. S. Bowers, Laser Radar Technology and Applications IV, Gary W. Kamerman, Christian Werner, Editors, Proceedings of SPIE, Vol. 3707, pumping pulse, 222–233 (1999). Note that in one embodiment, the pump laser pulse width is 18 nanoseconds in one embodiment operating at 9 milliradians for repetition rates between 10 and 20 Hz.

Note that in the subject application the pumping laser has a simple 1064 nanometers pumped non-critically phased matched KTP OPO-OPA architecture, with the optical parametric oscillator having an unstable resonator of magnification 1.2 as described in *"Improved OPO Brightness with a GRM Non-confocal Unstable Resonator"*, S. Chandra, T. H. Allik, J. A. Hutchinson, and M. S. Bowers, *"OSA Trends in Optics and Photonics on Advanced Solid State Lasers"*, Stephen A. Payne and Clifford R. Pollock (Optical Society of America, Washington, D. C., 1996), Vol. 1, 177–178, with both generated signal and residual pump directly pumping dual 20 millimeter length KTP OPA's. The pump beam spot size input to the optical parametric oscillator was approximate; 4×4 millimeters providing a 110 MW/cm² of drive.

Ideally the optical parametric oscillator threshold is set to provide approximately half the total OPO-OPA output. A low optical parametric oscillator threshold will couple too efficiently to high order oscillator modes and degrade the beam quality, while a high optical parametric oscillator threshold will force the amplified parametric florescence to dominate, also with poor beam quality.

It is noted that while the subject invention has been described in connection with eye safe lasers, the same techniques can be used at other wavelengths. The subject technique is thus usable at other wavelengths with the criteria that the non-linear converter is preferably non-critically phase matched, meaning that is has reduced alignment sensitivity. Whether or not non-critically phase matched, in one embodiment the subject system is usable in the mid infrared using an OPO-OPA combination involving zinc germanium phosphide crystals, with the laser being angle tunable between 3–5 microns and using a 2 micron pump laser.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. Apparatus for amplifying a single wavelength to provide a high intensity eye safe laser, comprising:
   a pumping source for producing pumping pulses at a first wavelength;
   an optical parametric oscillator coupled to said pumping source for generating energy at a second wavelength; and,
   an optical parametric amplifier coupled to said optical parametric oscillator for amplifying energy at said second wavelength utilizing energy from said pumping source, said oscillator, amplifier and pumping source located on a single beam line.

2. The apparatus of claim 1, wherein said pumping source outputs 1.0 micron pumping pulses.

3. The apparatus of claim 2, wherein said pumping pulses first pump said optical parametric oscillator, followed by pumping said optical parametric amplifier.

4. The apparatus of claim 3, wherein a small portion of the energy of a pumping pulse is first absorbed by said oscillator, leaving enough energy to pump said amplifier.

5. The apparatus of claim 4, wherein said pulses have a pulse length in excess of 15 nanoseconds.

6. The apparatus of claim 1, wherein said oscillator and said amplifier each include at least one non-linear crystal.

7. The apparatus of claim 6, wherein said crystals include KTP crystals.

8. The apparatus of claim 7, wherein said pumping source includes a neodynium YAG laser.

9. A method for increasing the range of an eye safe laser so that the laser can be used where these may be humans present, comprising the steps of:
   generating an eye safe laser output from an optical parametric oscillator pumped by a pumping source; and,
   amplifying the output of the optical parametric oscillator with an optical parametric amplifier utilizing energy from the pumping source along a single beam line, the oscillator and amplifier being pumped from the same source.

10. The method of claim 9, wherein the oscillator, amplifier and pumping source lie on a single beam line, thus to eliminate dual pumping and synchronization of the pumping of the oscillator and the amplifier.

11. The method of claim 9, wherein the eye safe laser is used for laser target designation.

12. The method of claim 9, wherein the eye safe laser is used for target illumination.

13. The method of claim 9, wherein the beam width of the laser beam produced by the eye safe laser has a beam quality of 24 mm-milliradians.

14. A method of extending the range of an eye safe laser without widening the beam width or synchronizing pumping pulses, comprising the steps of:
   generating an eye safe laser beam using an optical parametric oscillator;
   amplifying the output of the optical parametric oscillator with an optical parametric amplifier; and,
   pumping both the oscillator and the amplifier with the same pumping pulse from a pumping laser, the oscillator, the amplifier and the pumping laser being on a single beam line.

15. The method of claim 14, wherein the pumping laser emits radiation at 1.0 microns and wherein the oscillator has an output at 1.5 microns.

16. The method of claim 15, wherein the oscillator has a cavity defined by input and output mirrors and wherein the mirrors are coated so as to suppress any output other than 1.5 micron radiation.

17. A method of extending the range of a laser without widening the beam width or synchronizing pumping pulses, comprising the steps of:
   generating a laser beam using an optical parametric oscillator;
   amplifying the output of the optical parametric oscillator with an optical parametric amplifier; and,
   pumping both the oscillator and the amplifier with the same pumping pulse from a pumping laser, such that the pumping energy traverses alone a single line through the oscillator and amplifier.

18. A high intensity laser comprising in combination:
   a pumping source for producing pumping pulses at a first wavelength;
   an optical parametric oscillator for generating energy at a second wavelength; and,
   an optical parametric amplifier coupled to said optical parametric oscillator for amplifying energy at said second wavelength utilizing energy from said pumping source, said oscillator, amplifier and pumping source located on a single beam line, the pumping source energy that pumps said oscillator pumping said amplifier after passing through said oscillator.

* * * * *